Oct. 13, 1931.    A. F. O'CONNOR    1,826,815

HAND BRAKE WHEEL

Filed Jan. 17, 1930

Witness

Inventor
Arthur F. O'Connor
By Samuel W. Banning
Atty.

Patented Oct. 13, 1931

1,826,815

UNITED STATES PATENT OFFICE

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS

HAND BRAKE WHEEL

Application filed January 17, 1930. Serial No. 421,355.

This invention relates to a hand brake wheel.

The wheel of the present invention is designed particularly for use in the operation of a geared brake of a type now coming into extensive use on railroads.

In brake mechanisms of this character, the gear ratio employed is adequate to permit sufficient power to be applied by the hand operation of the brake wheel, and without the use of a club or bar, which was frequently employed in earlier forms of construction to secure an increased leverage in setting the brakes. In the case of gear brake mechanism, the use of such a club or bar is objectionable in that it increases the leverage to an undesirable degree and to an extent which might result in so firmly setting the brake shoes against the wheels as to cause sliding of the wheels on the rails, which is objectionable from every standpoint.

The wheel of the present invention is designed to prevent the insertion of a club or bar through the wheel at an angle which will permit its use and at the same time to retain or conserve the general configuration of a standard brake wheel.

Further objects and details will appear from a description of the invention, in conjunction with the accompanying drawings, wherein,—

Figure 1:
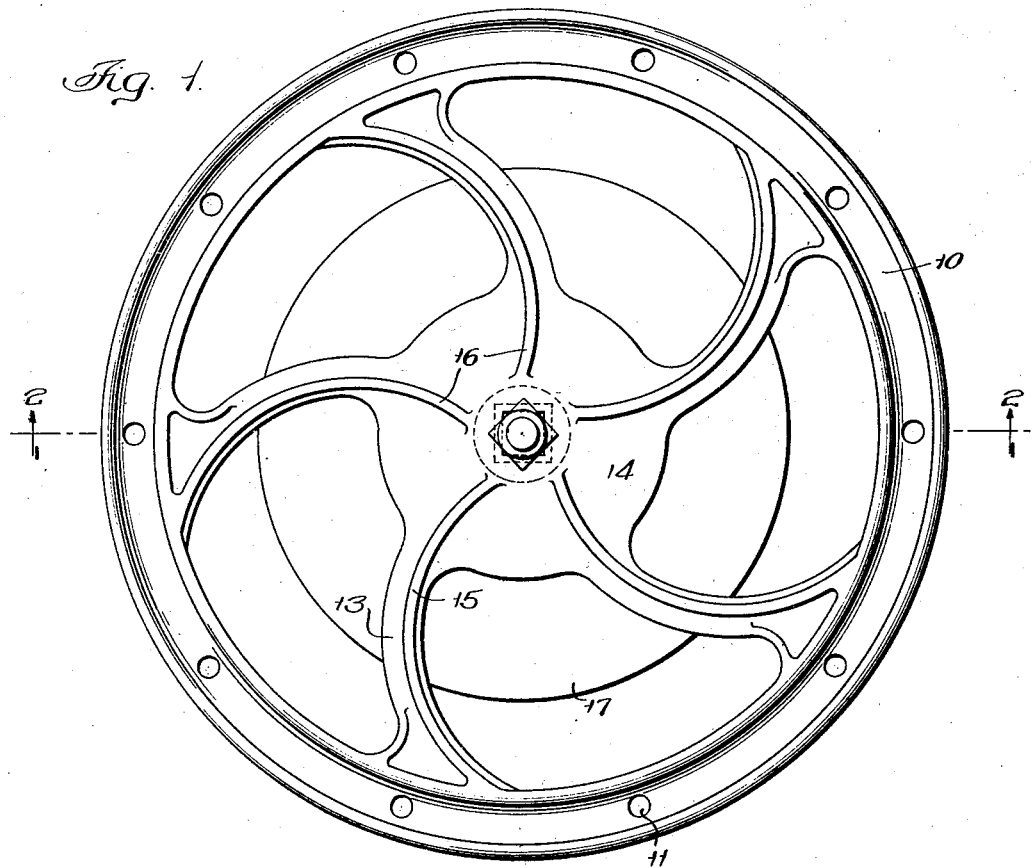
Figure 1 is a front elevation of the brake wheel.
Figure 2:
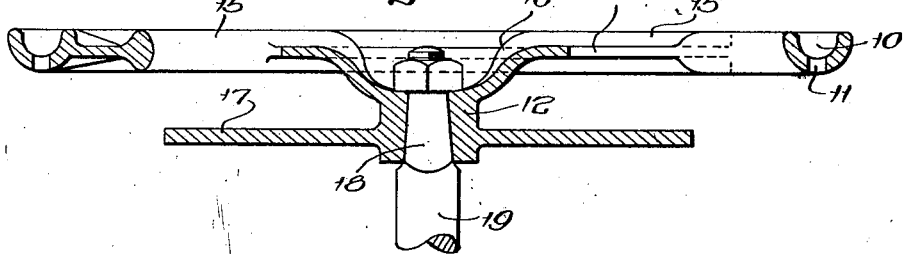
Fig. 2 is a cross sectional view.
Figure 3:
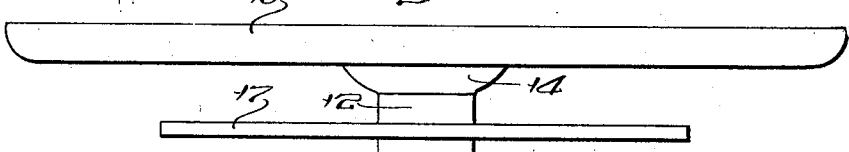
Fig. 3 is an edge elevation of the brake wheel.

The brake wheel comprises a rim 10 of channel formation, the channel being provided at recurrent intervals with apertures 11 to permit drainage in cases where the rim stands in horizontal relation, and the rim is connected to a hub 12 by the provision of curving spokes 13 which merge into a cupped web 14 formed integrally with the hub. Each of the spokes has formed thereon a reinforcing rib 15 which follows the curvature of the spoke and extends inwardly across the web and dips downwardly at its inner end 16.

Immediately below the body of the wheel and in parallel relation with the plane of the wheel is located a circular guard disk 17 which is formed integral with the hub and extends outwardly therefrom to a degree sufficient to prevent the insertion of a club or bar through the spaces between the spokes, at such an angle as would enable it to be effectively used as a lever in turning of the wheel.

The hub of the wheel is mounted upon the squared end 18 of a shaft 19 which operates in any adequate type of gear assembly, which, however, forms no part of the present invention.

As shown, the rim of the disk 17 lies slightly beyond the center of the spaces intermediate adjacent spokes, and sufficiently below the plane of the wheel so that it will not in any way interfere with the brakeman in firmly grasping the rim of the wheel, so that the openings between the spokes provided for the operator's hand are in no way restricted or impeded and at the same time the objectionable use of a club or bar is prevented.

Furthermore, the arrangement is one which can be readily applied to brake wheels of standard formation, without in any way changing or modifying the general structure of the wheel as a whole. Also, the guard disk 17 may be modified as an addition to existing wheels by brazing or otherwise securing the disk to the hub.

I claim:

1. In a brake wheel of the class described, the combination of a rim, a hub, spokes connecting the rim with the hub and affording open spaces between the spokes, and a guard plate located behind the body of the wheel and in spaced relation thereto and extending outwardly behind said spaces to an extent sufficient to prevent the effective use of a club in operating the wheel.

2. In a brake wheel of the class described, the combination of a rim, a hub, spokes connecting the rim with the hub and affording open spaces between the spokes, and a guard plate secured to the hub of the wheel behind the body thereof and in spaced relation thereto and extending outwardly from the hub behind the spaces between the spokes to a degree sufficient to prevent the effective use of a club in rotating the wheel.

3. In a brake wheel of the class described, the combination of a rim, a hub, spokes connecting the rim with the hub and affording open spaces between the spokes, and a circular guard disk secured to the hub of the wheel and lying in a plane parallel to the body of the wheel and behind the body of the wheel and extending outwardly behind the spaces between the wheel spokes to an extent sufficient to prevent the effective use of a club in operating the wheel.

4. In a brake wheel of the class described, the combination of a hub merging into a web portion, and spokes connecting the web portion with the rim leaving open spaces intermediate the spokes, and a disk shaped guard plate rigidly secured to the hub and extending outwardly therefrom in parallel relation to the plane of the body of the wheel and having its outer margin extended beyond the radial center of the openings between the spokes to prevent the effective use of a club in operating the wheel.

In witness that I claim the foregoing I have hereunto subscribed my name this 8th day of January, 1930.

ARTHUR F. O'CONNOR.